United States Patent [19]

Coppa et al.

[11] 4,299,461
[45] Nov. 10, 1981

[54] EXPOSURE AND FLASH FIRE CONTROL SYSTEM

[75] Inventors: Richard J. Coppa, Westwood; James K. Lim, Somerville; John C. Ostrowski, Maynard; Marie T. Rodriguez, Somerville, all of Mass.

[73] Assignee: Polaroid Corporation, Cambridge, Mass.

[21] Appl. No.: 135,512

[22] Filed: Mar. 31, 1980

[51] Int. Cl.³ ............... G03B 7/091; G03B 15/05
[52] U.S. Cl. ................................. 354/27; 354/33; 354/60 F; 354/137
[58] Field of Search ............ 354/27, 32, 33, 34, 354/60 F, 137, 138, 139, 145, 149

[56] References Cited

U.S. PATENT DOCUMENTS

| 3,478,660 | 11/1969 | Land . | |
|---|---|---|---|
| 3,744,385 | 7/1973 | Burgarella et al. . | |
| 3,791,278 | 2/1974 | Biber et al. . | |
| 3,832,722 | 8/1974 | Douglas | 354/29 |
| 3,942,183 | 3/1976 | Whiteside | 354/29 |
| 3,977,014 | 8/1976 | Norris | 354/196 |
| 4,040,072 | 8/1977 | Shenk . | |
| 4,040,072 | 8/1977 | Johnson et al. | 354/173 |
| 4,148,574 | 4/1979 | Johnson | 354/195 |
| 4,174,893 | 11/1979 | Burgarella et al. | 354/29 |
| 4,188,103 | 2/1980 | Biber et al. | 354/27 |
| 4,192,587 | 3/1980 | La Rocque et al. | 354/27 |

OTHER PUBLICATIONS

U.S. Patent Application Ser. No. 42,912 filed May 29, 1979 by Coppa, R. J.

Primary Examiner—Michael L. Bellner
Attorney, Agent, or Firm—Edward S. Roman

[57] ABSTRACT

A dual mode range responsive exposure and flash fire control system operates as a function of the photographic subject being located in either a near distance or a far distance range from the camera. For photographic subjects located within a near camera-to-subject distance range, a flash fire signal is normally provided during the exposure interval at the instant when the blade mechanism defines an aperture size generally corresponding to the camera-to-subject distance to ignite the flash and provide a determinate amount of illumination. For photographic subjects located within a far camera-to-subject distance range, a flash fire signal is normally provided subsequent to the shutter blades reaching a maximum aperture defining position with the flash output being subsequently quenched as a function of scene light detection and integration.

17 Claims, 9 Drawing Figures

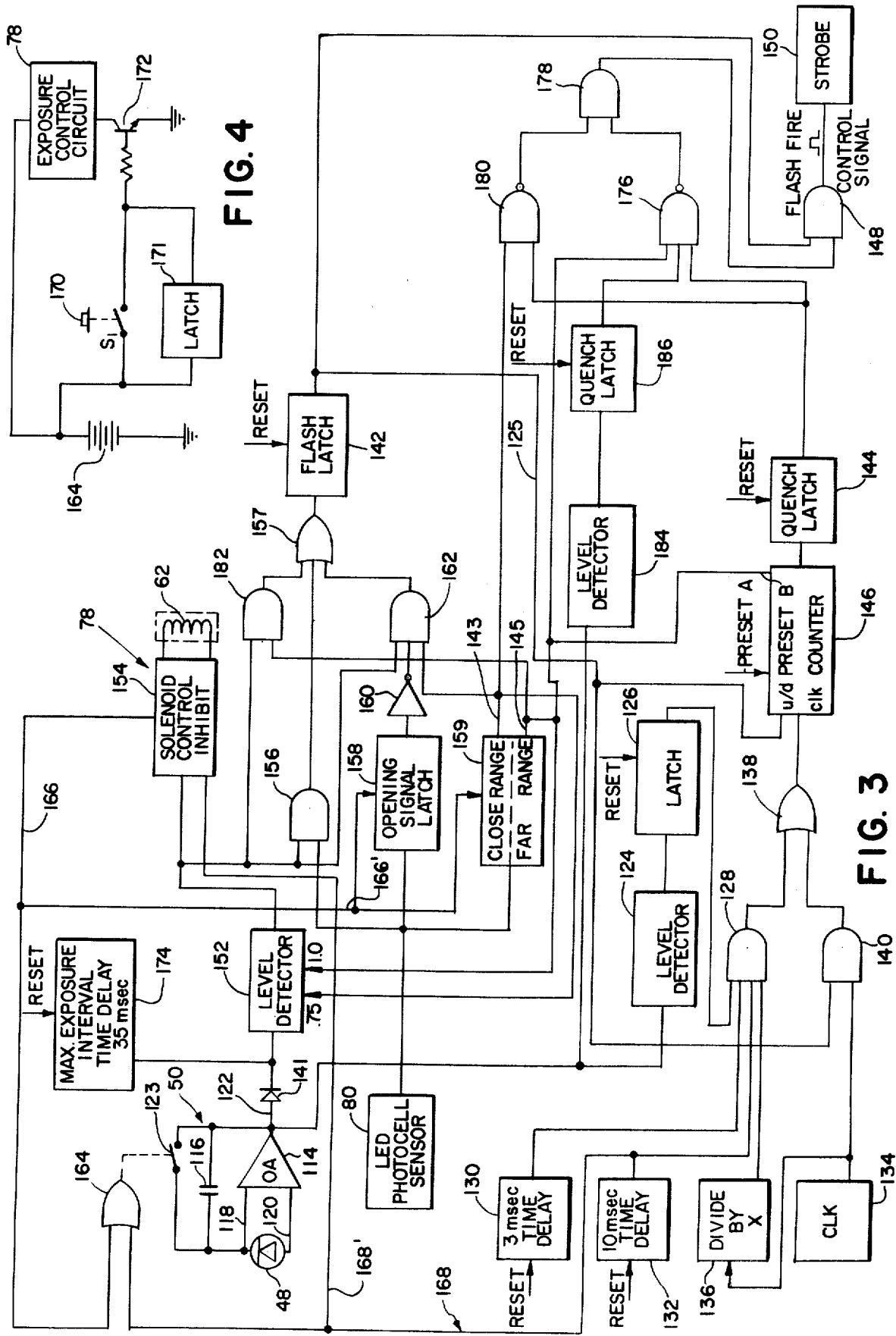

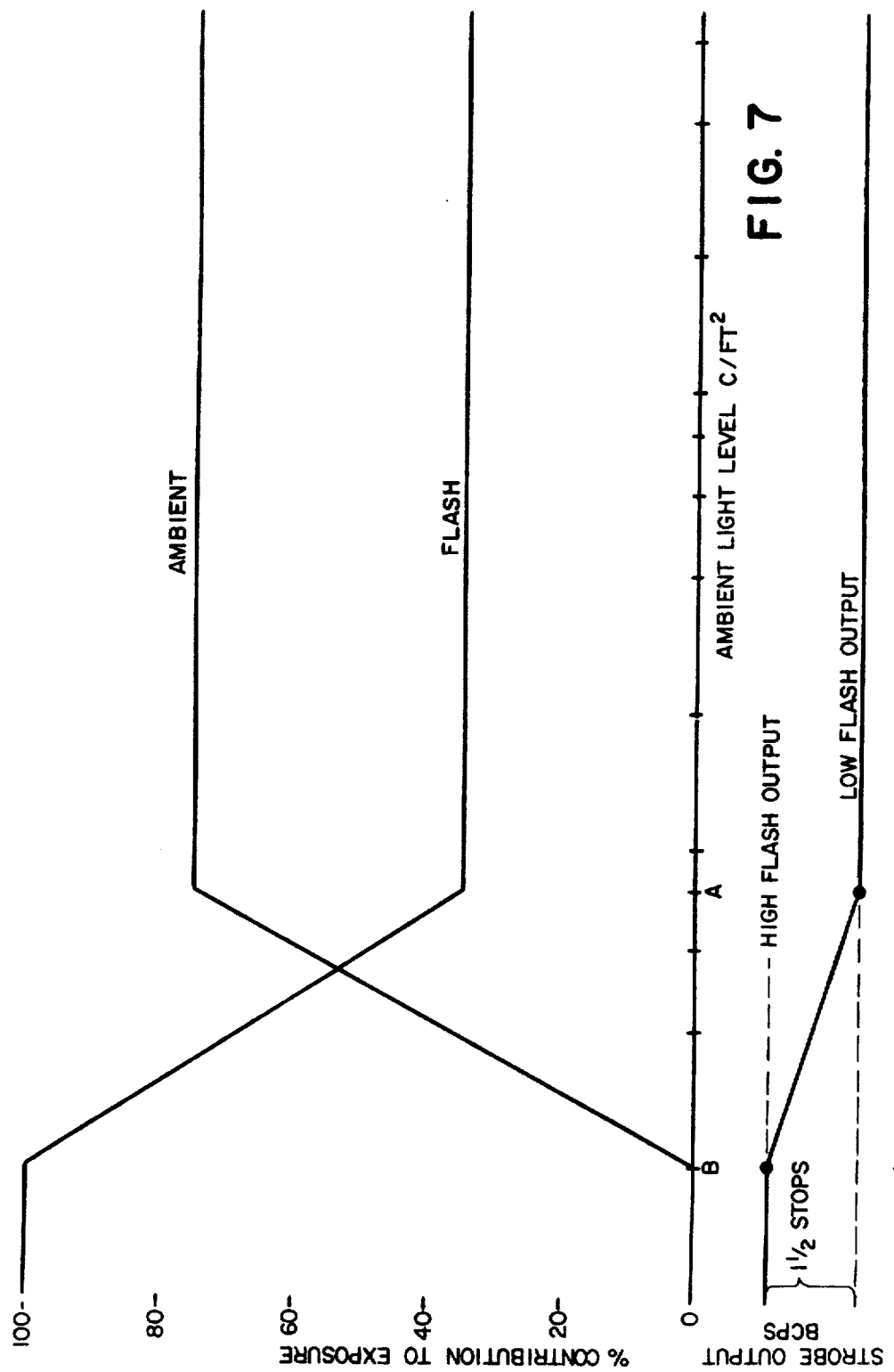

EXPOSURE AND FLASH FIRE CONTROL SYSTEM

BACKGROUND OF THE INVENTION

1. Field of the Invention

This invention relates generally to a dual mode range responsive exposure and flash fire control system for a photographic apparatus and, more particularly, to an exposure and flash fire control system for a photographic apparatus wherein the mode of exposure and flash fire control is determined as a function of the subject being located in either a near or far distance range from the camera.

2. Description of the Prior Art

In the photographic art, exposure control systems embodying scanning shutter blade elements which operate to vary exposure areas with time during the exposure interval are well known as indicated by U.S. Pat. No. 3,942,183, entitled "Camera with Pivoting Blades", by G. Whiteside, issued Mar. 2, 1976, in common assignment herewith. Such scanning shutter blade mechanisms generally include a pair of counter-reciprocating shutter blade elements each having a primary aperture that traverses the optical axis of the camera during the exposure interval. The primary apertures are shaped so that upon overlying one another during counter-movement of the blades, there is defined an effective exposure aperture value which increases to a maximum value in a determinate period of time.

Exposure control is provided by a pair of secondary photocell apertures in respective shutter blade elements which admit scene light to a photoresponsive element in correspondence with the scene light admitted to the focal plane during shutter blade movement through an exposure cycle. The output from the photoresponsive element is directed to an integrator circuit which triggers upon reaching an integration level corresponding to a desired exposure value to terminate the exposure interval by returning the shutter blade elements back to their initial scene light blocking position.

Shutter mechanisms of the aforementioned type are often arranged to operate in synchronism with a source of artificial illumination such as an electronic flash or strobe. The shutter blade mechanism and strobe are generally arranged to operate in either a high ambient scene light intensity mode of operation where no artificial illumination is provided or a low ambient scene light intensity mode of operation where the strobe is fired to provide a source of artificial illumination. Under conditions of low ambient scene light intensity where the strobe is expected to be fired, the scanning shutter blade mechanism may be stopped at an aperture value corresponding to the camera-to-subject distance as determined by focusing the objective lens. Systems of the aforementioned type are generally referred to as "follow focus" systems and the maximum aperture to which the scanning shutter blade elements are allowed to open is controlled by the rangefinding or focusing system of the camera in a manner as is more fully disclosed in U.S. Pat. No. 3,977,014, entitled "Follow Focus Exposure Control System With Improved Uniform Trim Control", by P. Norris, issued Aug. 24, 1976, in common assignment herewith.

Such a system need not actually stop the opening shutter blade movement at a maximum effective exposure aperture as determined by the rangefinding or focusing system of the camera but may, instead, vary the time at which the strobe light is fired during the opening shutter blade movement as determined in correspondence with the rangefinding or focusing system of the camera. Since the duration of the strobe light is short in comparison to the time required for the shutter blade mechanism to scan from its scene light blocking position to its maximum exposure aperture defining position, the aperture defined by the shutter blade elements at the instant of strobe firing for practical purposes constitutes the effective aperture by which the exposure occurs. Such a system is more fully described in U.S. Pat. No. 3,478,660, entitled "Photographic Apparatus With Flash Exposure Control System", by E. Land, issued Nov. 18, 1969, in common assignment herewith. Range responsive flash firing systems of the aforementioned type can also be utilized in conjunction with sonar rangefinding devices as more fully described in U.S. Patent Application Ser. No. 898,546, entitled "Range Synchronized Flash Photographic Apparatus And Method For Achieving Optimum Exposure", filed Apr. 21, 1978, in common assignment herewith.

Exposure and artificial illumination control systems of the aforementioned type are generally intended to provide a source of artificial illumination only during the low ambient scene light intensity mode of operation. However, there may also be conditions during high ambient scene light intensity modes of operation wherein it becomes desirable to provide artificial illumination to fill in the photographic subject against a brightly back lit scene as is more fully disclosed in U.S. Pat. No. 4,023,187, entitled "Exposure Control System With Fill Flash Race Condition", by E. Shenk, issued May 10, 1977, in common assignment herewith. The aforementioned artificial illumination control system operates under conditions of low ambient scene light intensity to fire the strobe light at a predetermined time period subsequent to the initiation of the exposure interval and under conditions of high ambient scene light intensity to fire the strobe light as a consequence of the time integration of the scene light intensity incident to the photoresponsive element reaching a predetermined value. This fill flash system, however, fails to provide a select ratio between that portion of the exposure which is directly attributable to the artificial scene illumination and the remaining portion of the exposure which is directly attributable to ambient scene light illumination over a determinate range of camera-to-subject distances.

More recently, a photographic exposure and flash fire control system as disclosed in U.S. patent application Ser. No. 960,062, entitled "Proportional Fill Flash", by A. LaRocque et al., filed Nov. 13, 1978, in common assignment herewith provided for the firing of a strobe in a fill flash mode of operation in a manner whereby a select ratio may be maintained between that proportion of the exposure which is directly attributable to the artificial scene illumination and the remaining proportion of the exposure which is directly attributable to the ambient scene light illumination. Such a select proportional fill flash is accomplished by providing a means whereby the light integration control circuit discounts the artificial illumination provided by the strobe. Toward this end, the system includes a sample and hold circuit which operates to sample the output voltage from a photoresponsive element and to transfer the sampled output voltage directly to a light integrating circuit. However, upon the firing of the strobe, the sample and hold circuit operates to hold the sampled voltage immediately prior to the firing of the strobe and to apply this sampled voltage to the light integrating circuit for the duration of the strobe pulse.

Most recently, a photographic exposure and flash fire control system as disclosed in U.S. patent application Ser. No. 42,912, entitled "Follow Focus Flash Arrangement", by R. Coppa et al., filed May 29, 1979, provides for a proportional fill-in flash by firing an electronic flash or strobe at an aperture appropriate for the camera-to-subject range. The flash is fired during the closing movement of the shutter blade mechanism and subsequent to the integration of ambient scene light to a select proportion of the optimum film exposure value whereby the remaining proportion of the optimum film exposure value is provided by the artificial illumination from the flash during the closing of the shutter blades.

For exposure control systems of the aforementioned type, it is often preferable to provide a substantially greater amount of artificial scene illumination during the ordinary flash mode of operation wherein the exposure influencing effect of the ambient scene light is negligible as opposed to the fill-in flash situation wherein the ambient scene light contribution to the exposure is most significant. Toward this end, there may be provided a pre-exposure ambient scene light measurement, in a manner as is fully described in U.S. Pat. No. 4,174,893, entitled "Exposure Control System For Use in Photographic Camera Apparatus", by J. Burgarella et al., issued Nov. 20, 1979. However, despite the aforementioned advancements and complexities in the state of the art for exposure and flash fire control systems, such systems may still be unduly limited in capability due to the fact that the exposure is still controlled in one primary mode of operation. Therefore, it is a primary object of this invention to provide a dual mode range responsive exposure and flash control system having greater range and control than heretofore provided.

Therefore, it is also a primary object of this invention to provide an exposure and flash control system wherein the mode of exposure and flash fire control is determined as a function of the subject being located in either a near or far distance range from the camera.

It is a further object of this invention to provide an exposure and flash fire control system wherein the flash is fired at an aperture corresponding to the camera-to-subject distance when the subject is located within a near distance range from the camera and wherein the flash is fired and thereafter quenced as a function of scene light integration when the subject is located within a far distance range from the camera.

Other objects of the invention will be in part obvious and will in part appear hereinafter. The invention accordingly comprises a mechanism and system possessing a construction, combination of elements and arrangement of parts which are exemplified in the following detailed disclosure.

SUMMARY OF THE INVENTION

A photographic camera for use with a variable output source of artificial illumination includes means for defining a film plane and means for transmitting light from a scene along an optical path to expose photosensitive film located in the film plane. The camera includes a ranging mechanism comprising a least one member disposed for movement in general correspondence with the camera-to-subject distance. There is also included a blade mechanism together with means for mounting the blade mechanism for displacement from an initial closed arrangement wherein the blade mechanism precludes scene light from being transmitted along the optical path to the film plane to an open arrangement wherein the blade arrangement defines a maximum size aperture so as to allow the passage of scene light along the optical path to the film plane and then to a final closed arrangement wherein the blade mechanism again precludes scene light from being transmitted along the optical path to the film plane. Drive means are provided for effecting the displacement of the blade mechanism from its initial closed arrangement to its open arrangement and then into its final closed arrangement to define an exposure interval during which scene light is incident upon the film plane.

Control means responsive to the movement of the ranging mechanism member by a distance corresponding to a camera-to-subject distance less than a selected camera-to-subject distance provide a flash fire signal during the exposure interval to ignite the source of artificial illumination to provide a determinate amount of artificial illumination. The exposure is controlled primarily by varying the aperture size at which the flash fire signal is provided. The control means further responds to the movement of the ranging mechanism member by a distance corresponding to a camera-to-subject distance greater than the selected camera-to-subject distance to provide a flash fire signal during the exposure interval wherein the exposure is controlled primarily by varying the amount of artificial illumination.

DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiment when read in connection with the accompanying drawings wherein:

FIG. 3 is a schematic circuit diagram of the exposure and flash fire control system of this invention;

FIG. 4 is a schematic circuit diagram showing additional circuitry for powering and actuating the exposure and flash fire control circuit of FIG. 3;

FIG. 6 is a graphical representation showing the variation in the flash output versus the variation in the ambient scene light intensity;

FIG. 7 is a graphical representation showing the variation in the contribution to the film exposure between the ambient scene light and the artificial scene light versus the variation in the ambient scene light intensity;

DESCRIPTION OF THE PREFERRED EMBODIMENT

Figure 1:
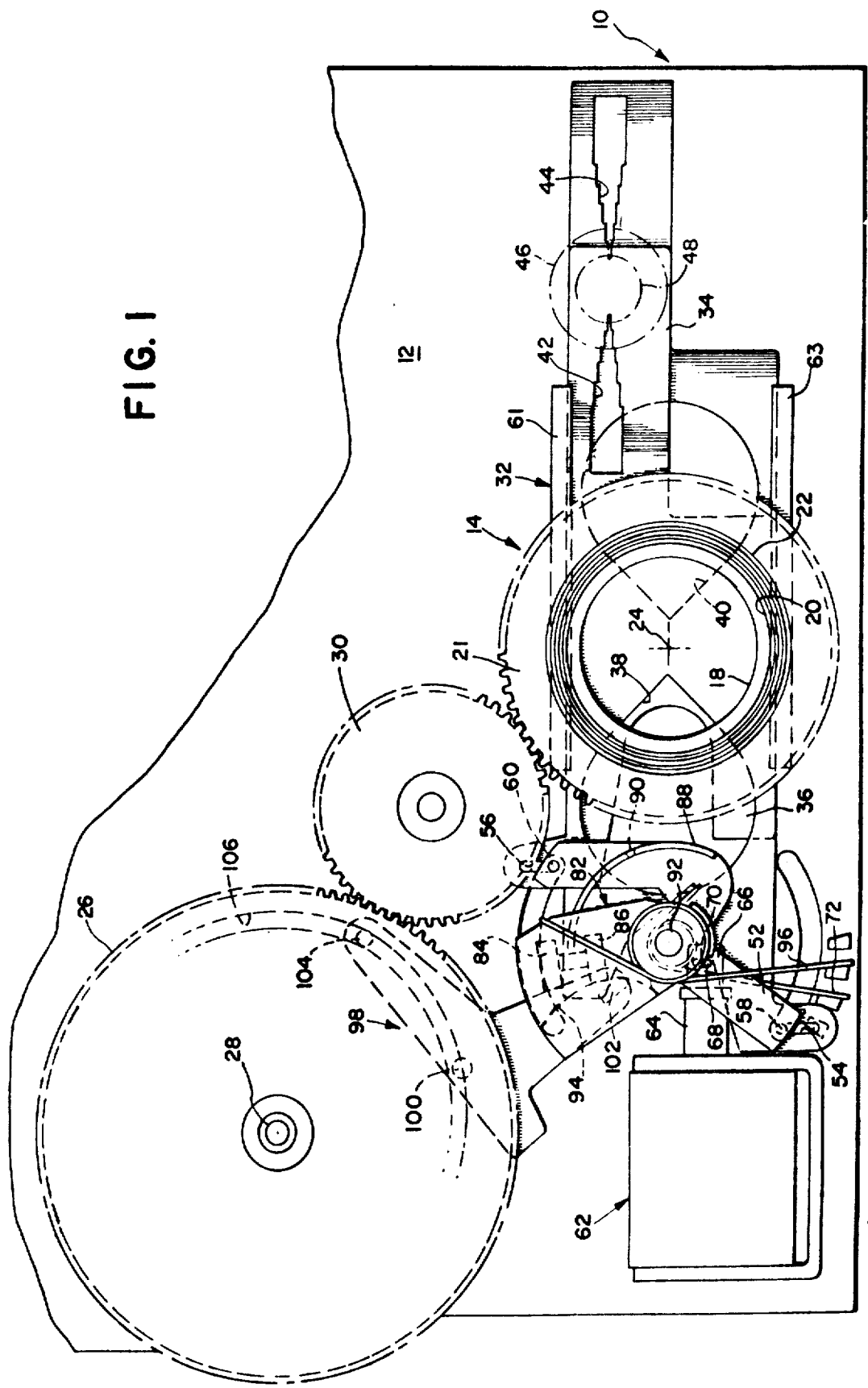
FIG. 1 is a front elevational view showing portions of the exposure and flash fire control system of this invention.
Figure 2:
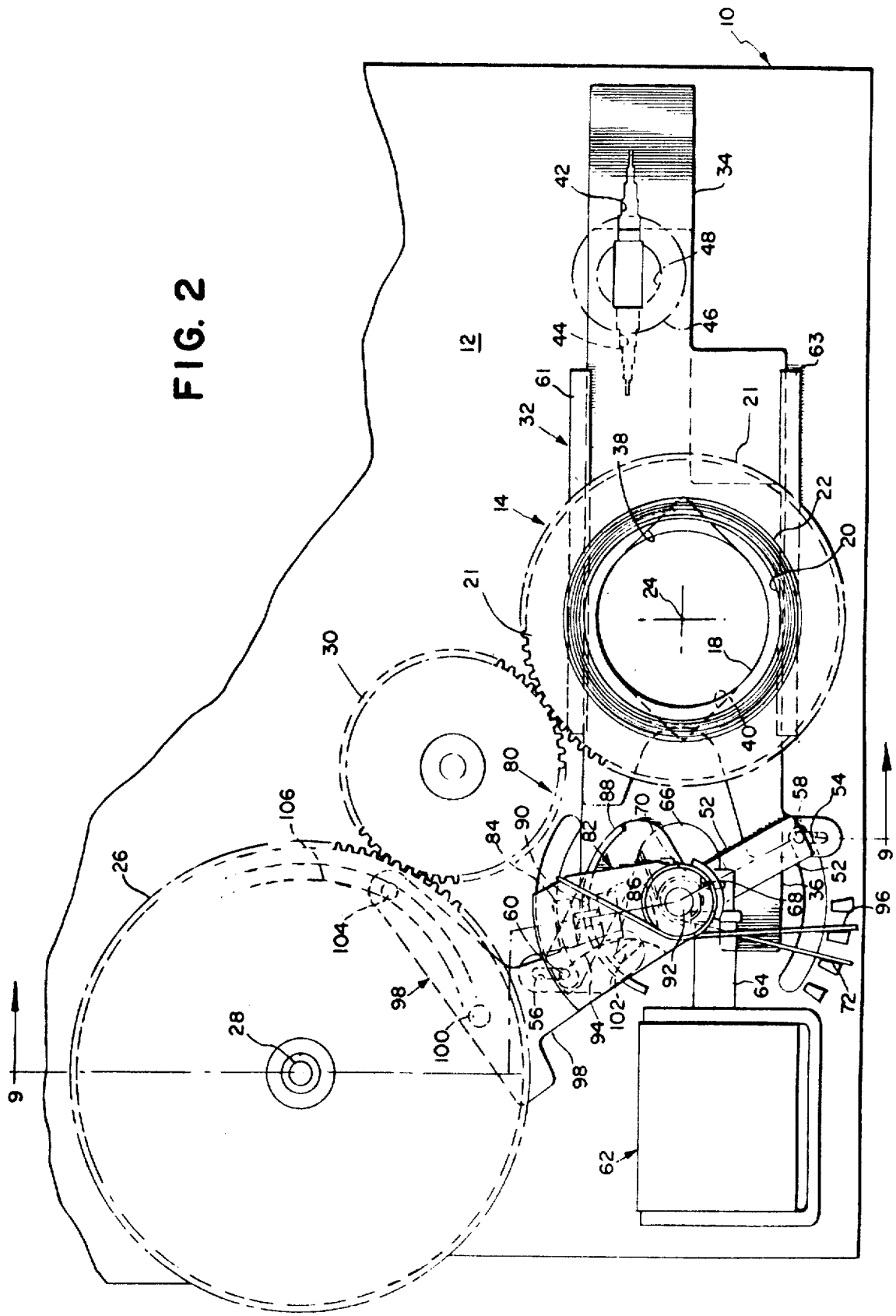
FIG. 2 is a front elevational view showing portions of the exposure and flash fire control system of FIG. 1 in a different position.

For referring now to FIGS. 1 and 2, it can be seen that the exposure and flash fire control system of this invention is associated with a photographic camera apparatus contained within a housing as shown generally at 10. A baseblock casting 12 is fixedly stationed within the housing 10 and selectively machined to support the various components of an exposure/control arrangement shown generally at 14. Centrally disposed within the baseblock casting 14, there is provided a light entry exposure opening 18 which defines the maximum available exposure aperture for the system.

An objective or taking lens 20 is provided in overlying relation to the light entry opening 18 and may comprise a plurality of individual lens elements retained in predetermined spaced relation by a cylindrical lens mount 22 which is externally threaded for toothed engagement within an internally threaded focus bezel 21. As is readily apparent, the focus bezel 21 is made rotatable with respect to the housing 10 to provide translational movement of the elements of lens 20 along a central optical axis 24 which is illustrated in FIGS. 1 and 2 as extending in a normal direction with respect to the plane of the drawing. Thus, rotation of the focus bezel 21 may be carried out in a manner to be subsequently described to provide displacement of the elements of objective lens 20 for focusing of image carrying rays through the light entry exposure opening 18 to a rearwardly positioned film plane by way of a reflecting mirror, all of which are stationed within a suitable lighttight film exposure chamber within the housing 10 as illustrated in U.S. Pat. No. 3,791,278, entitled "Photographic Apparatus With Solenoid Powered Instrumentalities", by C. Biber et al., issued Feb. 12, 1974, in common assignment herewith.

A manually rotatable focus wheel 26 is shown mounted upon a pivot pin 28 along one side of the housing 10. The focus wheel 26 is formed having peripherally disposed gear teeth which mesh with the gear teeth of an idler gear 30 which, in turn, is in driving connection with external gear teeth around the cylindrical focus bezel 21. Thus, as is now readily apparent, rotation of the focus wheel 26, in turn, operates to rotate the focus bezel 21 by way of the interconnecting idler gear 30 in a manner such that the rotational orientation of the focus wheel 26 continuously corresponds with the focus setting of the objective lens 30.

Intermediate the objective lens 20 and the light entry exposure opening 18, there is provided a shutter blade mechanism 32 including two overlapping shutter blade elements 34 and 36 of the so-called "scanning type" which are mounted for counter-reciprocating sliding movement with respect to each other in a manner to be herein described. The blade elements 34 and 36 include, respectively, scene light admitting primary apertures 38 and 40 to cooperatively define a progressive variation of effective aperture openings in accordance with simultaneous overlapping displacement of one blade element with respect to the other blade element in a manner as is described in the U.S. Pat. No. 3,832,722, entitled "Apparatus And System For Flash Photography", by L. Douglas, issued Aug. 27, 1974, in common assignment herewith. The apertures 38 and 40 are selectively shaped so as to overlap the light entry exposure opening 18 and thereby define a gradually varying effective aperture size as a function of the position of the blade elements 34 and 36.

Each of the blade elements 34 and 36 may additionally be configured to have corresponding photocell sweep secondary apertures as shown, respectively, at 42 and 44. Secondary apertures 42 and 44 may be configured in correspondence with the shapes of scene light admitting primary apertures 38 and 40. As is readily apparent, the secondary apertures 42 and 44 also move in correspondence with the primary apertures 38 and 40 to define a small secondary effective aperture for admitting the passage of scene light to a light detecting station as shown generally at 46. The light detecting station includes a photoresponsive element 48 which cooperates with a light integrating circuit as shown generally at 50 (FIG. 3) in a well-known manner in order to terminate the exposure as a function of the amount of light received through the secondary effective apertures 42 and 44.

The shutter blade elements 34 and 36 may be mounted to slide horizontally in any well-known manner such as by rails shown generally at 61 and 63. One end of each of the blade elements 34 and 36 includes an extended portion which pivotally connects to a walking beam 52. The walking beam 52, in turn, is disposed for rotation relative to the baseblock casting 12 by pivotal connection to baseblock casting 12 by a projecting pivot pin or stud 53 (FIG. 9) which may be integrally formed with the walking beam 52 and rotatably connected to the baseblock at a location spaced laterally apart from the light entry exposure opening 18. In the preferred mode, the walking beam 52 is generally connected at its distal ends to the shutter blade elements 34 and 36 by respective pin members 58 and 60 which extend laterally outward from the walking beam 52. The pin members are preferably circular in cross-section and extend through respective elongate slots 54 and 56 in respective blade elements 34 and 36 so as to accommodate horizontally restricted reciprocal movement of the blades 34 and 36 along a cord through the locus of rotation of the distal ends of the walking beam 52. Thus, the walking beam 52 and the horizontal blade mounting rails cooperate to provide a means for mounting the shutter blade elements 34 and 36 for displacement from an initial closed arrangement wherein the blade elements 34 and 36 preclude scene light from being transmitted along the optical path 24 to the film plane as shown in FIG. 1 to an open arrangement wherein the blade elements 34 and 36 define a maximum aperture so as to allow the passage of scene light along the optical path 24 to the film plane as shown in FIG. 2, and then to a final closed arrangement wherein the blade elements 34 and 36 again preclude scene light from being transmitted along the optical path 24 to the film plane as again shown in FIG. 1. As is readily apparent, such a displacement of the blade mechanism serves to define an exposure interval during which scene light is incident upon the film plane.

Drive means are provided for displacing the blade mechanism in the aforementioned manner and include a tractive electromagnetic device in the form of a solenoid 62 employed to displace the shutter blade elements 34 and 36 with respect to each other and the baseblock casting 12. The solenoid 62 includes an internally disposed cylindrical plunger unit 64 which retracts inwardly into the body of the solenoid upon energization of the solenoid 62 winding (see FIG. 3). The solenoid plunger 64 includes an end cap 66 at the outside end thereof together with a vertical slot or groove 68 within the end cap 66 for loosely engaging a pin 70 extending outwardly from the walking beam 52. In this manner, the solenoid plunger 64 is affixed to the walking beam 52 so that longitudinal displacement of the plunger 64 will operate to rotate the walking beam 52 around its pivot pin 53 so as to appropriately displace the shutter blade elements 34 and 36. The drive means may additionally include a torsion spring 72 so as to continuously urge the end cap 66 outward of the solenoid 62 thereby also continuously urging the blade elements 34 and 36 toward the largest effective aperture defining position over the light entry exposure opening 18. As will be readily understood, in some shutter blade arrangements, it may be preferable to utilize a tension spring or a compression spring in place of the torsion spring 72. Thus, with the spring connection herein described, the exposure and flash fire control system of this invention is biased to continuously urge the shutter blade elements 34 and 36 into an open orientation.

In the present arrangement, the shutter blades 34 and 36 are drawn from their open position to their closed position when the solenoid 62 is energized. Consequently, energization of solenoid 62 prevents the shutter blades 34 and 36 from moving towards their maximum aperture defining position under the urging of spring 72. However, as should be readily understood, the exposure and flash fire control system of this invention would be equally applicable to photographic systems where the blades 34 and 36 are spring biased in a normally close position. In addition, the invention herein described would be equally applicable to cameras of the reflex or non-reflex type. For cameras of the reflex type, such as Polaroid's SX-70 cameras, the shutter blade elements normally remain in an open orientation and are closed upon the initial actuation of the camera to implement a photographic exposure cycle in a well-known manner. For cameras of the non-reflex type, however, such as Polaroid's Pronto! and One Step cameras, a latch mechanism may be provided so that the blades may be maintained in a closed orientation regardless of the continued energization of the solenoid 62 and its attendant battery drain in a manner as is more fully described in U.S. Pat. No. 4,040,072.

Figure 9:
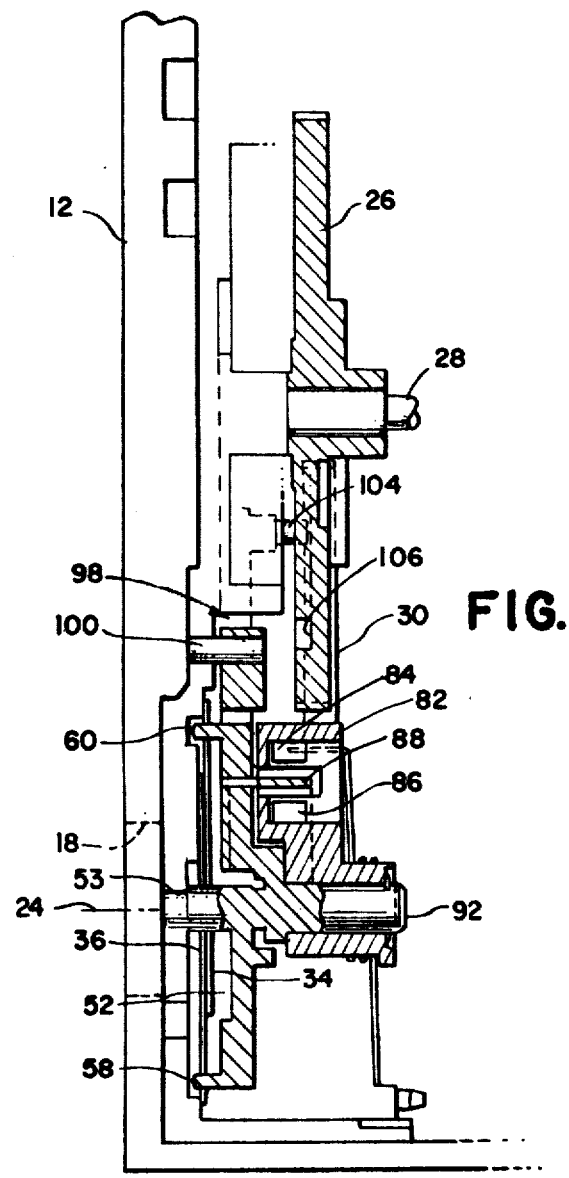
FIG. 9 is a cross-sectional view taken across the lines 9—9 in FIG. 2.

A range responsive flash fire sensing arrangement as shown generally at 80 (FIG. 3) comprises a rotatable sensor plate 82 disposed for rotation with respect to the baseblock casting 12 by a pivot pin 92 coaxially connected with respect to the pivot pin 53 (FIG. 9). The sensor plate 82 holds an LED 84 and a photoresponsive element 86 in spaced apart relation with respect to each other. An integral arcuate flange 88 extends laterally outward from the walking beam 52 and between the locus of rotation of the LED 84 and photoresponsive element 86 so as to block the light from the LED from reaching the photoresponsive element 86. The arcuate flange 88 includes a slit 90 thereacross which when aligned between the LED 84 and the photoresponsive element 86 allows the light from the LED to reach the photoresponsive element 86 and thereby provide the range responsive flash fire signal in a manner to be subsequently described.

The sensor plate 82 further includes an integral profile cam surface 94 which is continuously engaged by a cam mover pin 102 from a bell crank 98 disposed for rotation with respect to the baseblock casting 12 by an interconnecting pivot pin 100. The sensor plate 82 is yieldably biased by a torsion spring 96 to rotate in a counterclockwise direction thereby maintaining the cam surface 94 in continuous contact against the mover pin 102. The bell crank 98, in turn, includes a cam follower pin 104 engaged to follow a face groove cam 106 formed within the inward face of the focus wheel 26.

Turning now to FIG. 3, there is shown generally at 78 a schematic diagram for the exposure and flash fire control circuitry of this invention including the aforementioned scene light integrating circuit shown generally at 50. The circuit includes the photoresponsive element 48 which may be a photoresponsive cell of the type generating an output signal in correspondence with the levels of the scene light intensity incident thereon. The photoresponsive element 48 is orientated to evaluate the light levels of a scene coincident with the field of view of the lens system of the camera and operates in conjunction with the above-described aperture scanning arrangement which alters the amount of the scene light reaching the photoresponsive element 48 in correspondence with the progressively changing primary aperture size. The photoresponsive element 48 is coupled with an amplifier stage 114 along input lines 118 and 120 wherein the amplifier 114 is of a type sometimes referred to in the art as an "operational amplifier" which may be of a differential variety preferably fabricated in miniaturized form. When considered ideally, the amplifier 114 has infinite gain and infinite input impedance and a zero output impedance.

By virtue of a feedback path comprising an integration capacitor 116 connected between the input line 118 and an output line 122 from the operational amplifier 114, the photoresponsive element 48 is permitted to operate into an apparent low input impedance so as to function in a current mode, the current generated by the photoresponsive element 48 being limited substantially only by its internal impedance. Thus, under such loading, the photoresponsive element 48 in conjunction with the operational amplifier 114 and capacitor 116 is capable of providing a desirable linear output corresponding to the time integration of scene light intensity incident to the photoresponsive element 48.

Any difference of potential supplied by the photoresponsive element 48 across input leads 118 and 120 causes a voltage to be produced at output line 122. Relatively low signal voltages at the input of amplifier 114 which are present with the relatively low signal current from the photoresponsive element 48 are acted upon by the correspondingly high gain characteristic of the amplifier. Thus, although the amplifier 114 has a very high input impedance, the photoresponsive element 48, when connected in the circuit described, experiences only a very low impedance. Therefore, the current output of the photoresponsive element 48 is directed into the feedback path.

The initial charging of the integration capacitor 116 starts in synchronism with the opening of a parallel connected switch 123 in a manner to be subsequently described herein. The output signal from the light integrating circuit 50 at line 122 is directed to a first level detector 124 which may be of any conventional design such as a Schmitt trigger. The trigger or trip level (see FIG. 5) for the detector 124 is established at a value substantially less than the value representing an optimum film exposure for reasons which will become apparent from the following discussion. The output signal from the level detector 124 is directed to a latch circuit 126 which switches from a high (binary logic 1) output signal level to a low (binary logic 0) output signal level upon the input voltage to the detector 124 reaching its aforementioned trip level.

The output signal from the latch 126, in turn, is directed to one input terminal of an AND gate 128. The AND gate 128 receives additional input signals from a first time delay circuit 130 which initially assumes a high (binary logic 1) output signal level upon being reset, and from a second time delay circuit 132 which initially assumes a low (binary logic 0) output signal level upon being reset. The AND gate 128 also receives a slow input clock pulse signal derived from a fast clock pulse signal from a clock circuit 134. The fast output clock pulse from the clock circuit 134 is subsequently slowed by being divided by a constant x from a divide circuit 136. The output signal from the AND gate 128 is thereafter directed to an OR gate 138 which, in turn, provides an output clock signal to an up/down counter as shown at 146. The OR gate 138 receives another input signal from an AND gate 140 which, in turn, receives the fast clock pulse signal from the clock 134 at one input terminal. The up/down counter 146 receives both a first preset count by way of the reset input terminal and a mode select input signal from a flash latch circuit 142 by way of an interconnecting line 125. A second preset count is received by way of the preset input line for reasons which will become apparent from the following discussion. The output signal from the flash latch circuit 142 is also directed to the other input terminal to the AND gate 140 by way of the interconnecting line 125. The up/down counter 146, in turn, provides an output signal to a quench latch circuit 144 which, in turn, provides an output signal to one input terminal of a NAND gate 176. The output signal from the NAND gate 176, in turn, is directed to one input terminal of an AND gate 178 which, in turn, provides an output signal to one input terminal of another AND gate 148. The other input terminal to the AND gate 148 receives an input signal from the flash latch circuit 142 and, in turn, provides a flash fire control signal to fire and quench an electronic flash of the quench type as shown generally at 150. As is well known in the art, the flash fire control signal is generally a square wave wherein the leading edge of the flash fire signal is utilized to fire the electronic flash and the trailing edge of the flash fire signal is utilized to quench the electronic flash.

The output signal from the light integrating circuit 50 at line 122 is also directed by way of a diode 141 to another level detector circuit 152 which may also be of any conventional design such as a Schmitt trigger. The trigger or trip level established by the level detector 152 may be varied in a well-known manner between a level that is preferably less than the level representative of an optimum film exposure and a level that is generally representative of an optimum film exposure for reasons which will become apparent from the following discussion. The output signal from the level detector 152 is directed to a solenoid control circuit as shown generally at 154 which operates to control the solenoid 62 in a manner as is more fully described in U.S. Pat. No. 3,791,278, supra. The output signal from the level detector 152 is also directed to an AND gate 156, the output of which is directed to the flash latch circuit 142 by way of an OR gate 157. The output from the LED/photocell sensor arrangement 80 is directed to the other input terminal of the AND gate 156 and also to a pair of latch circuits as shown generally at 158 and 159. The output from the latch 158, in turn, is inverted by an inverter gate 160 and thereafter directed to an input terminal of an AND gate 162. The AND gate 162 receives another input signal from the output of the level detector 152 and, in turn, provides an input signal to the OR gate 157.

The latch 159 provides a first output signal by way of a line 143 to still another input terminal to the AND gate 162. The first output signal from latch 159 along line 143 is also directed to an input terminal of a NAND gate 180 and to the level detector 152 in order to control the trip level thereof for reasons which will become apparent from the following discussion. The other input terminal to the NAND gate 180 is connected to receive the output signal from the quench latch 144. Latch 159 provides a second output signal by way of a line 145 to another input terminal to the NAND gate 176 and to one input terminal of an AND gate 182. The other input terminal to the AND gate 182 receives an output signal from the level detector 152 and the AND gate 182, in turn, provides an output signal to still another input terminal to the OR gate 157. The second output signal from the latch 159, provided by way of line 145, is directed to the preset input count terminal of the up/down counter 146 to provide the aforementioned second preset count and also to the level detector 152 in order to control the trip level thereof again for reasons which will become apparent from the following discussion.

The switch 123 is controlled by way of an OR gate 164 which receives one input signal from the solenoid control circuit 154 by way of an interconnecting line 166. The OR gate 164, in turn, receives another input signal from the time delay circuit 132 by way of an interconnecting line 168 for reasons which will become more apparent from the following discussion. The latch circuits 158 and 159 are also controlled to operate at different times from the solenoid control circuit 154 by way of the line 166 in a manner to be subsequently described.

The output signal from the light detector 50 is also directed to a quench level detector 184 which may also be of any conventional design such as a Schmitt trigger. The trigger level established by the quench level detector 184 is preferably less than the level representative of an optimum film exposure for reasons which will become apparent from the following discussion. The output signal from the level detector 184, in turn, is directed to a quench latch 186 which, in turn, provides an output signal to another input terminal of the NAND gate 176.

The exposure and flash fire control circuit 78 as shown in FIG. 3 is preferably energized from a battery 164 as shown in FIG. 4. A photographic exposure cycle is commenced by depressing an actuator button 170 which, in turn, operates to close a switch $S_1$ to apply battery power to the exposure and flash control circuit 78 by turning on a ground return control transistor 172. As is readily apparent, the battery supply voltage will be maintained in connection to the exposure and flash fire control circuit 78 only as long as the photographer maintains the button 170 in its depressed state which may be perfectly adequate for situations where the human reaction time in depressing and releasing the button 170 substantially exceeds the longest exposure cycle time likely to be incurred. However, in situations where the normal exposure cycle time is likely to exceed the human reaction time in depressing and releasing the button 170, there may be provided a latch circuit, as shown generally at 171, in parallel connection with respect to the switch S₁ for maintaining continuous energization of the exposure and flash fire control circuit 78 even after release of the button 170 and the opening of switch S₁. A suitable automatic latch circuit is more fully described in U.S. Pat. No. 3,744,385, entitled "Control System For Photographic Apparatus", by J. Burgarella et al., issued July 10, 1973, in common assignment herewith.

As is well understood, prior to the commencement of a photographic exposure cycle, the photographer must compose and frame the subject to be photographed and thereafter focus the camera with regard to the photographic subject range. Focusing may be accomplished by the manual rotation of the focus wheel 26 which operates, in turn, by way of the idler gear 30 to rotate the focus bezel 21 and thereby axially displace the elements of the taking lens 20 to achieve the appropriate focus condition. As will be readily understood, the focus wheel 26 may alternatively be rotated in an automatic manner by sonar controlled apparatus of the type currently embodied in Polaroid's sonar One Step cameras.

Rotation of the focus wheel 26 and its associated face groove cam 106 operates to displace the cam follower pin 104 so as to rotate the bell crank 98 about its pivot pin 100. Rotation of the bell crank 98, in turn, operates by way of the cam mover pin 102 engaging the profile cam surface 94 to rotate the sensor plate 82 about its pivot pin 92. In this manner, the sensor plate 82 and its associated LED 84 and photoresponsive element 86 may be positioned in accordance with the range of the subject to be photographed along a locus of rotation adjacent the walking beam 52 locus of rotation. The LED/photocell combination can thus respond at any of its positions along its locus of rotation to the slit 90 in the walking beam flange 88 subsequently reaching an aligned position between the LED 84 and photoresponsive element 86 in which the shutter blade elements define an effective aperture value corresponding to the subject range. Thus, the slit 90 may be subsequently rotated during an exposure interval to unblock the light path between the LED 84 and the photoresponsive element 86 when the blade mechanism reaches the aperture defining position corresponding to the subject range adjusted position of the sensor plate 82.

The photographer may now commence a photographic exposure cycle by depressing the button 170 so as to close the switch S₁ and thereby apply battery 164 supply voltage to energize the exposure and flash fire circuit 78 by turning on the ground return control transistor 172. As is readily apparent, it is assumed that the electronic flash 150 is in its fully charged ready condition prior to the photographer actuating the button 170.

Energization of the exposure and flash fire control circuit 78 operates in a well-known manner to reset the aforementioned latch and time delay circuits as well as to preset the up/down counter 146 by way of preset A to a predetermined number of counts which for this example can be eight pulse counts. The time delay circuit 132 is reset to provide a high (binary logic 1) output signal level for a predetermined time interval of preferably 10 msec. The signal from circuit 132 is, in turn, directed to an inhibit input terminal of the solenoid control circuit 154 by way of interconnecting lines 168 and 168'. Receipt of the inhibit input signal by the solenoid control circuit 154 operates to delay the energization of the solenoid 62 so as to leave the plunger 64 in its withdrawn position with the shutter blade elements 34 and 36 in the scene light unblocking position as shown in FIG. 2.

Time delay circuit 130 is also reset upon the closure of switch S₁ at the initiation of the exposure cycle to provide a low (binary logic 0) output signal level which operates to inhibit the gating of the slow clock pulse from the divide by x circuit 136 by the AND gate 128 for an initial time period preferably 3 msec. after which the output signal changes to a high (binary logic 1) output signal level. Thus, the high (binary logic 1) output signal level from the time delay circuit 132 together with a high (binary logic 1) output signal level from latch 126 resulting from the initial reset thereof operate subsequent to the expiration of the 3 msec. time delay of circuit 130 to gate and AND gate 128 on and thereby input the slow clock pulse train from the divide by x circuit 136 into the counter 146 by way of the OR gate 138 for the remainder of the 10 msec. time delay of circuit 132.

The high (binary logic 1) output signal level from the time delay circuit 132 is also simultaneously directed to one input terminal of the OR gate 164 so as to provide a high (binary logic 1) output signal level therefrom which is effective to open the switch 123 and thereby commence scene light integration. The photoresponsive element 48 provides an appropriate current response corresponding to the ambient scene light intensity thereon which current response is thereafter integrated by the operational amplifier 114 and feedback capacitor 116 to provide an output signal representative of the time integration of the ambient scene light intensity incident to the photoresponsive element 48.

Figure 5:
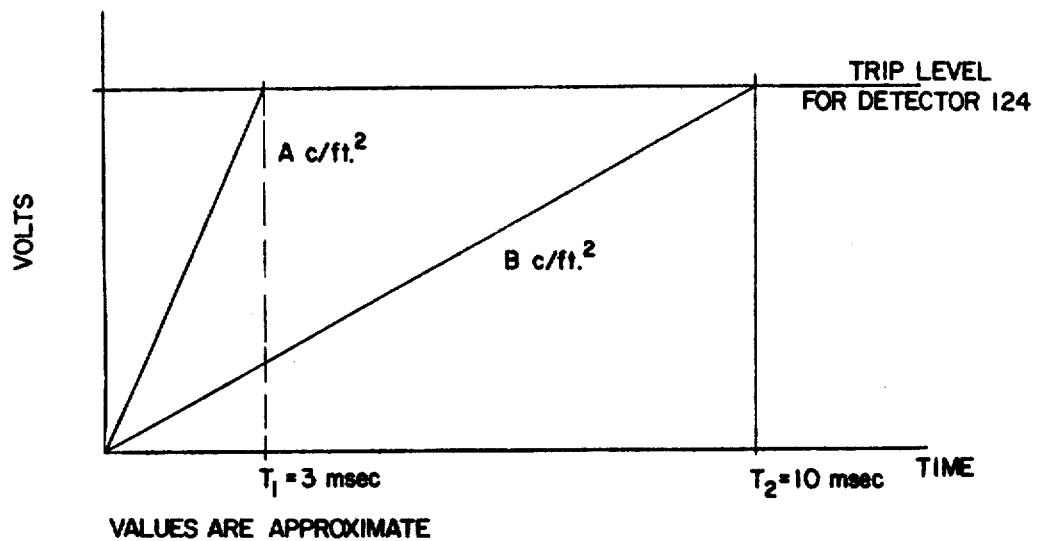
FIG. 5 is a graphical representation showing the pre-exposure ambient scene light integration under various conditions of ambient scene light intensity.

Under conditions of relatively high ambient scene light intensity where, for example, the ambient scene light intensity is equal to or greater than a select level such as A c/ft.$^2$, the scene light integration curve will have a relatively steep slope equal to or greater than the integration curve A c/ft.$^2$ as shown in FIG. 5. The relatively high level A of ambient scene light intensity is preferably selected to correspond to the minimum level of ambient scene light intensity which will still provide for a generally adequate film exposure during the maximum exposure interval allowable without incurring adverse blurring effects from the normally expected hand motion of the photographer for a select film speed and exposure aperture size. The maximum time allowable for an exposure so as not to incur any adverse blurring effects from the normally expected hand motion of the photographer has been found to be generally in the order of 35 milliseconds.

Under conditions of relatively low ambient scene light intensity where, for example, the ambient scene light intensity is equal to or less than a select level such as B c/ft.$^2$, the scene light integration curve will have a relatively flat slope equal to or less than the integration curve B c/ft.$^2$ as shown in FIG. 5. The relatively low level B of ambient scene light intensity is preferably selected to correspond to the maximum level of ambient scene light intensity which will have a negligible film exposure influence during the aforementioned maximum exposure interval (35 msec.) allowable without incurring any adverse blurring effects from the normally expected hand motion of the photographer for a select film speed and exposure aperture size.

Assuming now that in the foregoing example the ambient scene light intensity is relatively low, i.e., B c/ft.$^2$ or less. The scene light integration will then proceed at a rate no greater than the curve B c/ft.$^2$ of FIG.

5 and trigger the level detector 124 at a time no less than T₂. Triggering the level detector 124, in turn, operates to trigger the latch 126 to switch from a high (binary logic 1) output signal level to a low (binary logic 0) output signal level thereby gating off the slow clock pulse train from the divide by x circuit 136.

The initial reset of the flash latch circuit 142 provides a low (binary logic 0) output signal level therefrom which is directed by way of the interconnecting line 125 to one input terminal of the AND gate 140 so as to inhibit the gating of the clock pulse therethrough. In addition, the initial low (binary logic 0) output signal level from the flash latch 142 is also directed by way of the interconnecting line 125 to select a particular mode of operation for the counter 146 which for this example is an up count, although as will be readily appreciated, a down count could also have been used instead.

Thus, under the aforementioned condition of low ambient scene light intensity, either equal to or less than B c/ft.², the slow clock pulse from the divide by x circuit 136 is gated by the AND gate 128 and OR gate 138 to the up/down counter 146 which as previously discussed operates in an up count mode. The counter is preset at eight counts and continues to count up from the termination of the 3 msec. time delay to the termination of the 10 msec. time delay for a total of 25 counts. If the ambient scene light is exactly B c/ft.², the scene light integration will proceed at a rate sufficient to trigger the level detector 124 and latch 126 in synchronism with the expiration of the 10 msec. time delay as most clearly shown in FIG. 5. If the ambient scene light intensity is less than B c/ft.², then the scene light integration will occur at a slower rate and the 10 msec. time delay will expire to terminate the up count to the counter 146 before the level detector 124 is triggered. Thus, the maximum up count that can be provided to the counter 146 is 25 counts regardless of how low the ambient scene light intensity decreases.

The expiration of the 10 msec. time delay in addition to inhibiting the AND gate 128 also operates by way of the interconnecting line 168 to switch the OR gate 164 and thereby provide a low (binary logic 0) output signal level to close the switch 123 and thereby discharge the integration capacitor 116. In addition, the low (binary logic 0) output signal level from the 10 msec. time delay circuit 132 also operates by way of the interconnecting lines 168 and 168' to remove the inhibit signal from the solenoid control 154 so as to energize the solenoid 62 winding to retract the plunger 64 and thereby rotate the walking beam 52 in a counterclockwise direction as viewed from FIGS. 1 and 2 against the biasing force of spring 72 thereby moving the shutter blade elements into the light blocking position as shown in FIG. 1.

Thus ends the pre-exposure flash fire control ambient scene light measurement which inputs the counter 146 in a manner whereby the stored counts may be subsequently retrieved during the actual exposure interval to control the duration of the flash fire signal in a manner to be subsequently discussed. As should be readily apparent, the aforementioned pre-exposure flash fire control ambient scene light measurement occurs with the shutter blade elements 34 and 36 in the scene light unblocking position as shown in FIG. 2 without exposing the film since the film plane is covered by a rotatable mirror (not shown) in the manner as more fully described in U.S. Pat. No. 3,791,278, supra.

After the pre-exposure flash fire control ambient scene light measurement, the solenoid control 154 operates to energize the solenoid 62 and move the shutter blade elements 34 and 36 into the scene light blocking position of FIG. 1. The aforementioned rotatable mirror is thereafter moved out of scene light blocking relation with respect to the film plane in a well-known manner as again described in U.S. Pat. No. 3,791,278, supra.

The solenoid control 154 further operates during the solenoid 62 period of energization by way of the interconnecting lines 166 and 166' to disable the latch 158 and to enable the latch 159 to provide camera-to-subject distance logic signals in the manner of this invention. Focusing in the foregoing manner for camera-to-subject distances less than a select camera-to-subject distance which preferably is in the order of 10–12 feet operates to move the sensing plate 82 into position such that the edge of the walking beam flange 88 becomes positioned between the LED 84 and photoresponsive element 86 upon movement of the shutter blade elements into the scene light blocking position of FIG. 1. The sensor arrangement 80 thus provides a low (binary logic 0) output signal level to the latch 159, which in turn responds by providing a high (binary logic 1) output signal level along line 143 and a low (binary logic 0) output signal level along line 145. Conversely, if the camera should be focused for a camera-to-subject distance greater than the select camera-to-subject distance, then the sensing plate 82 would be moved in the foregoing manner into position such that the edge of the walking beam flange 88 becomes positioned so as not to block the light path between the LED 84 and photoresponsive element 86 upon movement of the shutter blade elements into the scene light blocking position of FIG. 1. The sensor arrangement 80 would thus conversely provide a high (binary logic 1) output signal level to the latch 159, which in turn would respond by providing a low (binary logic 0) output signal level along line 143 and a high (binary logic 1) output signal level along line 145. The camera operation will now be described for a camera-to-subject distance less than the select camera-to-subject distance wherein the latch 159 provides a high (binary logic 1) output signal level along line 143 and a low (binary logic 0) output signal level along line 145 subsequent to the shutter blade elements 34 and 36 being moved into the scene light blocking arrangement of FIG. 1.

With the film plane unblocked, the exposure interval is commenced upon the deenergization of the solenoid 62 by the solenoid control circuit 154 which simultaneously operates by way of the interconnecting line 166 to provide a high (binary logic 1) output signal level to the OR gate 164 thereby again opening switch 123 to commence scene light integration in synchronism with the shutter blade opening movement. The solenoid control circuit 154 also simultaneously operates by way of interconnecting lines 166 and 166' to disable the latch 159 from responding to further changes in its input signal and to enable the latch 158 to respond to any subsequent changes in its input signal in a manner to be described.

Deenergization of the solenoid 62 operates to release the shutter blade elements 34 and 36 to move under the urging influence of the drive spring 72 from the scene light blocking arrangement as shown in FIG. 1 toward the maximum aperture defining position as shown in FIG. 2 so as to define a continuous ever increasing progression of effective apertures over the optical center axis 24. The photocell sweep secondary apertures 42 and 44 also define a continuous progression of ever increasing apertures over the photoresponsive element 48. Under the aforementioned condition of low ambient scene light intensity equal to or less than B c/ft.$^2$, the scene light integration will not proceed at a sufficiently rapid rate to trigger the level detector 152 prior to the expiration of the 35 msec. time delay which is the maximum exposure allowable without incurring the adverse blurring effects from the normally expected hand motion of the photographer. The 35 msec. time delay may be provided by a time delay circuit as shown at 174 and under the aforementioned conditions will operate to provide a sufficiently high (binary logic 1) output signal level to trigger the level detector 152 to change its output state from a low (binary logic 0) output signal level to a high (binary logic 1) output signal level thereby signaling the solenoid control 154 to energize the solenoid 62 winding and retract the plunger 64. The walking beam 52 will thereby be rotated in a counterclockwise direction as viewed from FIGS. 1 and 2 against the biasing force of spring 72 so as to move the shutter blade elements 34 and 36 back into the scene light blocking position as shown in FIG. 1.

Upon commencement of the aforementioned photographic exposure interval, the LED/photocell sensor arrangement 80 still provides a low (binary logic 0) output signal level since the walking beam flange 88 operates to block the light from the LED 84 from reaching the photoresponsive element 86. The output from the latch 158, which is enabled in the aforementioned manner by the solenoid control 154 upon deenergization of the solenoid 62, is also at a correspondingly low (binary logic 0) output signal level and this low output level is provided to the inverter 160. The output from the inverter 160 is thus at a high (binary logic 0) output signal level and operates in conjunction with the high (binary logic 1) output signal level from line 143 of latch 159 to enable the AND gate 162. Initial rotation of the walking beam flange slit 90 between the LED 84 and photoresponsive element 86 operates to unblock the light path therebetween so as to provide a high (binary logic 1) output signal level from the sensor arrangement 80. This high output level, in turn, enables the AND gate 156 and simultaneously triggers the latch 158 to provide an output of high voltage level corresponding to a high (binary logic 1) output signal level. The high (binary logic 1) output signal level from the latch 158, in turn, is inverted by the inverter 160 to disable the AND gate 162 for the remainder of the exposure interval. As soon as the slit 90 passed out of alignment between the LED 84 and photoresponsive element 86, the output signal level from the sensor 80 goes back to a low (binary logic 0) signal level so as to disable the AND gate 156.

Thus, under the aforementioned condition of low ambient scene light intensity equal to or below B c/ft.$^2$, the walking beam flange slit 90 is rotated between the LED 84 and photoresponsive element 86 prior to the maximum exposure interval time delay circuit 174 triggering the level detector 152. As is now readily apparent, triggering of the level detector 152 operates only to energize the solenoid 62 since the AND gate 156 is in a disabled state as a result of the low (binary logic 0) output signal level from the sensor 80, and the AND gate 182 is also in a disabled state as a result of the low (binary logic 0) output signal level from line 145 of latch 159. Energization of the solenoid 62, however, operates to reverse the direction of rotation of the walking beam 52 so as to rotate the walking beam flange slit 90 back again between the LED 84 and photoresponsive element 86 so as to provide another high (binary logic 1) output signal level to one input terminal of the AND gate 156. The other input terminal to the AND gate 156 is already enabled by the high (binary logic 1) output signal level from the level detector 152 and therefore switches to provide a high (binary logic 1) output signal level to actuate the flash latch circuit 142 by way of the OR gate 157 thereby switching the flash latch circuit 142 from a low (binary logic 0) output signal level to a high (binary logic 1) output signal level.

The change in the output signal from the flash latch circuit 142 operates: to gate the AND gate 148; to select the down count mode of operation for the counter 146; and to enable the AND gate 140 to gate the fast clock pulse train from the clock 134 to the OR gate 138. Since the initial reset input to the quench latch circuit 144 operated to reset the quench latch to provide low (binary logic 0) signal levels to the NAND gates 176 and 180, in turn, providing high (binary logic 1) signal levels to the AND gate 178, the AND gate 148 was initially enabled to switch to a high (binary logic 1) output signal level upon receipt of the high (binary logic 1) output signal level from the flash latch 142. The switching of the flash latch circuit 142 in response to the walking beam flange slit 90 being rotated between the LED 84 and photoresponsive element 86 during the closing movement of the shutter blade elements operates to provide the leading edge of the flash fire control signal directed to the flash 150. As previously discussed, the leading edge of the flash fire control signal operates to fire the flash 150. Thus, in the foregoing manner, the flash is fired during the closing movement of the shutter blade elements at the effective aperture appropriate for the range of the subject to be photographed.

Simultaneous to the flash latch 142 firing the strobe 150, the counter 146 commences counting down at the fast clock pulse rate from the clock 134. Upon reaching a zero count, the output from the counter 146 switches to actuate the quench latch 144 and thereby switch the output therefrom to a high (binary logic 1) output signal level which is directed to respective input terminals of the NAND gates 180 and 176. Since the other input terminal to the NAND gate 180 is at a high (binary logic 1) input signal level by virtue of the aforementioned camera-to-subject logic signal from the line 143 of latch 159, the high (binary logic 1) output signal from the quench latch 144 operates to switch the NAND gate 180 to provide a low (binary logic 0) output signal level to the AND gate 178 and, in turn, inhibit the AND gate 148 and thereby provide the trailing edge of the flash fire control signal. As previously discussed, the trailing edge of the flash fire control signal operates to quench the flash 150 in a wellknown manner. Since under the foregoing condition of low ambient scene light intensity either equal to or less than B c/ft.$^2$, the counter 146 counts down the maximum number of counts possible (25), there is provided a long flash duration with a high flash output when the camera is focused for a camera-to-subject distance less than the select camera-to-subject distance.

Referring now to the graph of FIG. 7 where there is shown a graphical representation of the percentage of film exposure attributable to ambient scene light and artificial flash light plotted as a function of the variation in the ambient scene light level, it can be seen that under the foregoing condition of low ambient scene light intensity (equal to or less than B c/ft.$^2$), the entire exposure is directly attributable to the artificial flash light provided by the flash 150 which is controlled to provide a high flash output as shown in the graph of FIG. 6 where the flash output is plotted as a function of the variation in the ambient scene light level.

Under conditions of high ambient scene light intensity greater than or equal to A c/ft.$^2$, the exposure and flash fire control system of this invention provides for a proportional fill-flash photographic exposure wherein select percentages of the exposure may be attributable to ambient and artificial flash light and wherein the amount of artificial flash light is considerably reduced in comparison to the amount of artificial flash light provided by the previously discussed low ambient scene light condition. For example, the difference in the amount of artificial flash light provided under conditions of high and low ambient scene light intensity may be in the order of one and a half stops as shown graphically in FIG. 6.

Under the aforementioned conditions of high ambient scene light intensity and camera-to-subject distance less than the select camera-to-subject distance, the photographer commences a photographic exposure cycle in the same manner by depressing the photographic actuator button 170 so as to close switch S$_1$ and reset the various latch and time delay circuits of the exposure and flash fire control circuit 78. The aforementioned preexposure flash fire control ambient scene light measurement occurs upon resetting the 10 msec. time delay circuit 132 which, in turn, operates to inhibit the solenoid control circuit 154 from energizing the solenoid 62 for 10 msec. Time delay circuit 132 also gates the OR gate 164 to open the switch 123 and thereby commence scene light integration by the integrator circuit 50. Under conditions of high ambient scene light intensity, the scene light integration output signal will progress so rapidly as to trip the level detector 124 either at or before the expiration of 3 msec. as best shown in FIG. 5. Whereas, the 3 msec. time delay circuit 130 operates to inhibit the gating of the slow clock pulse from the divide by x circuit 136 into the counter 146, no clock pulses can be counted up beyond the preset number of eight clock pulses. Thus, the preexposure flash fire control ambient scene light measurement under conditions of high ambient scene light intensity equal to or greater than A c/ft.$^2$ results in the minimal eight pulse count input to the up/down counter 146.

The photographic exposure interval commences subsequent to the shutter blade elements moving to the scene light blocking arrangement of FIG. 1 and the sensor 80 and latch 159 providing the camera-to-subject distance logic signals in the aforementioned manner. The shutter blade elements 34 and 36 are thereafter released upon deenergization of the solenoid 62 to move under the urging of the influence of the drive spring 72 from the scene light blocking arrangement as shown in FIG. 1 toward the maximum aperture defining position as shown in FIG. 2 so as to define the continuous ever increasing progression of effective apertures over the optical center axis 24. Under the aforementioned conditions of high ambient scene light intensity, the photocell sweep secondary apertures 42 and 44 define a continuous progression of ever increasing apertures over the photoresponsive element 48 which provides an appropriate current response corresponding to the scene light intensity thereon which current response is thereafter integrated by the operational amplifier 114 and feedback capacitor 116 to provide an output signal representative of the time integration of the scene light intensity incident to the photoresponsive element 48. The output signal level at line 122 from the light integrating circuit 50 increases until reaching the trigger level selected by latch 159 for level detector 152 so as to trigger the level detector 152 into an abrupt change of state at its output line from a generally low (binary logic 0) output signal level to a high (binary logic 1) output signal level sufficient to actuate the solenoid control circuit 154 to energize the solenoid 62 winding to retract the plunger 64. The walking beam 52 is thereby rotated in a counterclockwise direction as viewed from FIGS. 1 and 2 against the biasing force of spring 72 so as to move the shutter blade elements 34 and 36 into the light blocking position as shown in FIG. 1.

As previously discussed, upon commencement of the aforementioned photographic cycle, the LED/photocell sensor arrangement 80 provides a low (binary logic 0) output signal level since the walking beam flange 88 operates to block the light from the LED 84 from reaching the photoresponsive element 86. The output from the latch 158 is also at a correspondingly low voltage signal level (binary logic 0) and this low output level is provided to the inverter 160. Thus, the opening blade rotation of the walking beam slit 90 between the LED 84 and photoresponsive element 86 operates to enable the AND gate 156 while simultaneously triggering the latch 158 to provide an output of high voltage level corresponding to a binary logic 1 signal level which, in turn, is inverted by the gate 160 to provide a low (binary logic 0) output signal level to disable the gate 162 for the remainder of the exposure interval. Thus, in this manner the opening movement of the shutter blade elements is prohibited from actuating the flash latch 142 and thereby, in turn, firing the flash.

However, upon the closing movement of the shutter blade elements 34 and 36 the walking beam flange slit 90 is again moved between the LED 84 and photoresponsive element 86 so as to provide another high (binary logic 1) output signal level to one input terminal of the AND gate 156. The other input terminal to the AND gate 156 is already enabled by the high (binary logic 1) output signal level from the level detector 152 and therefore switches to provide a high (binary logic 1) signal level to actuate the flash latch 142. Thus, only the ambient scene light is integrated during the opening movement of the shutter blade elements 34 and 36 and the strobe is subsequently fired during the closing movement of the shutter blade elements at the effective aperture appropriate for the range of subject to be photographed. Since the ambient scene light is only integrated to a level corresponding to some proportion of the optimum film exposure value (preferably 75 percent) as determined by the camera-to-subject distance logic signals from the latch 159 to the level detector 152, with the strobe providing the remaining proportion of the light required for a full film exposure, there is provided a true proportional fill-flash wherein the proportions of the exposure value directly attributable to the ambient scene light and the artificial scene light provided by the flash remains substantially constant under conditions of varying ambient scene light intensity and subject range within the select camera-to-subject distance.

Actuation of the flash latch 142, in turn, causes the counter 146 to count down in the aforementioned manner at the fast clock rate from the clock 134. Since the counter had previously only stored eight counts during the aforementioned pre-exposure flash fire control ambient scene light measurement, it is readily apparent that the zero count will be reached in substantially less time than for the previously described low ambient scene light intensity condition. Upon reaching the zero count, the output from the counter actuates the quench latch circuit 144 to switch the NAND gate 180 and AND gate 178 ultimately inhibiting the gate 148 and terminating the flash fire control signal to the flash 150 as previously described.

Referring now to the graph of FIG. 7, there is shown the percentage contribution of the film exposure attributable to ambient scene light and artificial flash light under the aforementioned conditions where the ambient scene light intensity is either equal to or greater than A c/ft.$^2$, and the camera-to-subject range is less than the select camera-to-subject range. The artificial flash light is shown graphically as providing a contribution of 35 percent to the 75 percent contribution from the ambient scene light which shows an overall exposure of 110 percent. Such proportions, however, do not generally provide an overexposure for reasons which will become apparent from the following discussion. The artificial flash light for the high ambient scene light condition is preferably one and a half stops down from the high flash output provided under the low ambient scene light condition as evident from the graph of FIG. 6.

Under conditions of the aforementioned high ambient scene light intensity and close subject range, i.e., less than the select camera-to-subject range, it is possible that the level detector 152 will be triggered to actuate the control circuit 154 to energize the solenoid 62 winding prior to the walking beam 52 rotating a sufficient degree for the slit 90 to pass between the LED 84 and photoresponsive element 86. Under these conditions, the latch 158 will not be triggered prior to the energization of the solenoid 62 winding and will, therefore, provide a high (binary logic 1) output signal level by way of the inverter 160 to one input terminal of the AND gate 162. A second input terminal to the AND gate 162 is already at a high (binary logic 1) input signal level by virtue of the aforementioned camera-to-subject logic signal received from line 143 of latch 159. Triggering of the level detector 152, in turn, will provide another (binary logic 1) input signal level to the third input terminal of the AND gate 162 so as to switch the output from the AND gate 162 to a high (binary logic 1) signal level thereby actuating the flash latch 142 by way of the OR gate 157 to provide the appropriate leading edge to the flash fire signal to the flash 150 in general synchronism with the energization of the solenoid 62 winding. Thus, the flash 150 will not be fired at the effective aperture appropriate for the range of the subject to be photographed but at some smaller aperture which is nevertheless the maximum effective aperture possible which approximates the appropriate aperture from the subject range.

Thus, the actual contribution to the exposure from the artificial flash light under the aforementioned condition will be less than that had the strobe been fired at the appropriate aperture for the subject range and, therefore, the 35 percent contribution to exposure from the strobe as shown in the graph of FIG. 7 will more closely approximate a 25 percent contribution. The flash output is thus increased to provide a higher than expected contribution of 35 percent to film exposure to account for those situations where the electronic flash must be fired at some aperture smaller than the appropriate aperture for the corresponding subject range.

Under conditions of intermediate ambient scene light intensity between A c/ft.$^2$ and B c/ft.$^2$ and a camera-to-subject distance less than the select camera-to-subject distance, the pre-exposure flash fire control ambient scene light measurement occurs in the aforementioned manner whereupon the photoresponsive element 48 provides an appropriate current response corresponding to the scene light intensity incident thereon. The current response is thereafter integrated by the operational amplifier 114 and feedback capacitor 116 to provide an output signal representative of the time integration of the ambient scene light intensity incident to the photoresponsive element 48. The output signal level at line 122 from the light integrating circuit 50 increases until reaching the trigger level for the level detector 124 so as to switch the output from the level detector 124 from a low (binary logic 0) output signal level to a high (binary logic 1) output signal level thereby actuating the latch 126 to switch from a high (binary logic 1) output signal level to a low (binary logic 0) output signal level to inhibit the gate 128 and terminate the slow clock pulse input to the up/down counter 146. As is now readily apparent, under conditions of intermediate scene light intensity, the level detector 124 is triggered at some time after the minimum 3 msec. time delay provided by the time delay circuit 130 and prior to the expiration of the 10 msec. time delay provided by the time delay circuit 132. Thus, the number of clock pulses counted by the counter 146 corresponds directly to the level of ambient scene light intensity and is greater than the minimum preset eight clock pulse count and less than the maximum 25 clock pulse count.

A photographic exposure interval is thereafter commenced in the foregoing manner with the flash latch circuit 142 being actuated at the appropriate instant during the photographic exposure cycle to provide the leading edge of the flash fire control signal while simultaneously actuating the counter 146 to operate in a countdown mode and enabling the AND gate 140 to gate the fast clock pulse from the clock 134. The counter 146 thereafter counts down to zero so as to actuate the quench latch 144 to provide the trailing edge of the flash fire control signal which operates to quench the flash 150. As is readily apparent, the countdown period for the counter 146 corresponds directly to the number of counts previously counted up during the previous pre-exposure flash fire control ambient scene light measurement and thus operates to vary the duration of the flash fire control signal in inverse correspondence with the intensity of the ambient scene light detected prior to exposure.

Referring again to FIG. 7, there is shown graphically a progressive decrease in the contribution to the film exposure from the artificial flash light as the ambient scene light intensity increases from B c/ft.$^2$ to A c/ft.$^2$ for camera-to-subject distances less than the select camera-to-subject distance. As is readily apparent for conditions of low ambient scene light intensity of less than B c/ft.$^2$, the strobe contribution to the film exposure is substantially 100 percent while under conditions of ambient scene light intensity greater than A c/ft.$^2$ the strobe contribution to exposure remains substantially constant at 35 percent. In addition, there is also shown graphically the progressive increase in the contribution to film exposure from the ambient scene light as the ambient scene light increases from B c/ft.$^2$ to A c/ft.$^2$.

Under conditions of ambient scene light intensity greater than A c/ft.$^2$, the contribution to the film exposure from ambient scene light remains substantially constant at 75 percent.

Figure 8:
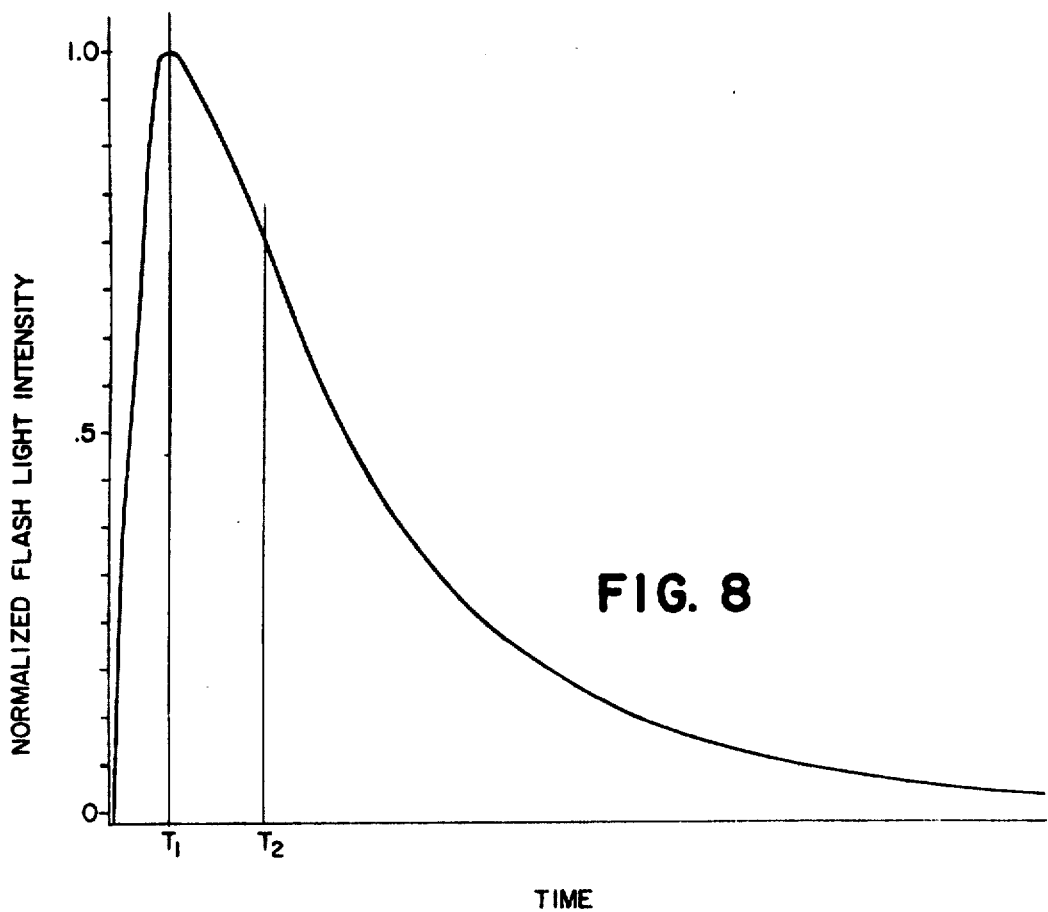
FIG. 8 is a graphical representation showing the variation in the flash output versus time.

Referring now to FIG. 8, there is shown a graphical representation of the variation in the artificial flash light intensity versus time. Under conditions of high ambient scene light intensity, it can be seen that the artificial flash is preferably quenched at time $T_1$ to provide a low flash output while under conditions of low ambient scene light intensity the artificial flash is quenched at time $T_2$ to provide a high flash output. Under conditions of intermediate ambient scene light intensity where the ambient scene light intensity is between A and B c/ft.$^2$, the artificial flash may be quenched at between time $T_1$ and $T_2$ which corresponds inversely to the ambient scene light intensity detected during the pre-exposure flash fire control ambient scene light measurement. Thus, the flash may be quenched along a substantially linear portion of its output response curve between $T_1$ and $T_2$ to provide a substantially uniform corresponding relationship between the progressively increasing amount of flash light versus the progressively decreasing amount of ambient scene light under the aforementioned conditions where the camera-to-subject distance is less than the selected camera-to-subject distance. In this manner, there is provided a substantially smooth and uniform transition from the normal flash mode wherein the film exposure is substantially entirely attributable to artificial flash light to the normal fill-flash mode wherein a determinate percentage of the film exposure may be attributable to artificial flash light.

Under conditions where the camera is focused for camera-to-subject distances greater than the selected camera-to-subject distance, the photographer still commences a photographic exposure cycle in the aforementioned manner by depressing the photographic actuator button 170 so as to close switch $S_1$ and reset the various latch and time delay circuits of the exposure and flash fire control circuit 78. The aforementioned pre-exposure flash fire control ambient scene light measurement occurs upon reset with the 10 millisecond time delay circuit 132 operating to inhibit the solenoid control circuit 154 from energizing the solenoid 62 for 10 milliseconds. Time delay circuit 132 also gates the OR gate 164 to open the switch 123 and thereby commence scene light integration by the integrator circuit 50. The pre-exposure flash fire control ambient scene light measurement thereby inputs the counter 146 in the aforementioned manner.

After the ambient scene light measurement, the solenoid control 154 operates to energize the solenoid 62 and move the shutter blade elements 34 and 36 into the scene light blocking position as shown in FIG. 1. As previously discussed, the solenoid control 154 further operates during the period of solenoid 62 energization by way of the interconnecting lines 166 and and 166' to disable the latch 158 and to enable the latch 159 to provide the camera-to-subject distance logic signals. Under the aforementioned condition where the camera is focused for a camera-to-subject distance greater than the select camera-to-subject distance, the sensing plate 82 is moved into position such that the edge of the walking beam flange 88 becomes positioned so as not to block the light path between the LED 84 and photoresponsive element 86 when the shutter blade elements are moved into the scene light blocking position of FIG. 1. Thus, the sensor arrangement 80 provides a high (binary logic 1) output signal level to the latch 159 which, in turn, responds by providing a low (binary logic 0) output signal level along line 143 and a high (binary logic 1) output signal level along line 145.

The high (binary logic 1) output signal level from line 145 of latch 159 operates to change the trigger or trip level of the level detector 152 from the aforementioned level that is preferably less than the level representative of an optimum film exposure to a higher level that is generally representative of an optimum film exposure. The high (binary logic 1) output signal level from line 145 of latch 159 further operates to preset the counter 146 by way of preset B to a minimum number of counts regardless of the number of counts previously inputted to the counter 146 during the pre-exposure flash fire control ambient scene light measurement. The preset minimum count inputted to the counter 146 is preferably equivalent to the minimal eight pulse count inputted to the counter during a pre-exposure flash fire control ambient scene light measurement which would occur under conditions of high ambient scene light intensity equal to or greater than A c/ft.$^2$. The high (binary logic 1) output signal level on line 145 from latch 159 further operates to enable the NAND gate 176 while conversely the low (binary logic 0) output signal level on line 143 from latch 159 operates to disable the NAND gate 180 and the AND gate 162.

The exposure interval is thereafter commenced upon the deenergization of the solenoid 62 by the solenoid control circuit 154 which simultaneously operates by way of the interconnecting line 166 to provide a high (binary logic 1) output signal level to the OR gate 164 thereby again opening switch 123 to commence scene light integration in synchronism with the shutter blade opening movement. As previously discussed, the solenoid control circuit 154 also simultaneously operates by way of interconnecting lines 166 and 166' to disable the latch 159 from responding to further changes in its input signal and to enable the latch 158 to respond to any subsequent change in its input signal from the sensor arrangement 80. The shutter blade elements 34 and 36 are, thus, released to move from the scene light blocking arrangement as shown in FIG. 1 toward the maximum aperture defining position as shown in FIG. 2 to define a continuous ever-increasing progression of effective apertures over the optical center axis 24. The photocell sweep secondary apertures 42 and 44 also define a corresponding continuous progression of ever-increasing apertures over the photoresponsive element 48.

Under conditions of low ambient scene light intensity, the scene light integration will not proceed at a sufficiently rapid rate to trigger the level detector 152 prior to the expiration of the 35 millisecond time delay which is the maximum exposure allowable without incurring the adverse blurring effects from the normally expected hand motion of the photographer. Thus, under conditions of low ambient scene light intensity, the time delay circuit 174 will operate to provide a sufficiently high (binary logic 1) output signal level to trigger the level detector 152 to change its output state from a low (binary logic 0) output signal level to a high (binary logic 1) output signal level thereby signaling the solenoid control 154 to energize the solenoid 62 winding and retract the plunger 64. The shutter blade elements 34 and 36 are thereafter moved from the position as shown in FIG. 2 back to the position as shown in FIG. 1.

Commencement of the aforementioned photographic exposure interval operates to immediately move the edge of the walking beam flange 88 into position to block the light from the LED 84 from reaching the photoresponsive element 86 thereby changing the low (binary logic 0) output signal level from the sensor arrangement 80 to a high (binary logic 1) output signal level. As previously discussed, opening movement of the shutter blade elements operates to move the walking beam flange slit 90 between the LED 84 and photoresponsive element 86 so as to unblock the light path therebetween and provide a high (binary logic 1) output signal level from the sensor arrangement 80. This high output level, in turn, enables the AND gate 156 and simultaneously triggers the latch 158 to provide an output of high voltage level corresponding to a high (binary logic 1) output signal level. The high (binary logic 1) output signal level from the latch 158, in turn, is inverted by the inverter 160 to provide a low (binary logic 0) output signal level to the AND gate 162 for the remainder of the exposure interval. As soon as the slit 90 passes out of alignment between the LED 84 and photoresponsive element 86, the output signal level from the sensor goes back to a low (binary logic 0) signal level so as to disable the AND gate 156.

Under the aforementioned conditions of low ambient scene light and far subject range beyond the select camera-to-subject distance, triggering the level detector 152 provides a high (binary logic 1) output signal level to one input terminal of the AND gate 182 which was previously enabled by a high (binary logic 1) output signal level from line 145 of latch 159. Thus, the output from the AND gate 182 switches to a high (binary logic 1) output signal level, in turn, switching the output signal from the OR gate 157 to a high (binary logic 1) output signal level thereby switching the flash latch circuit 142 from a low (binary logic 0) output signal level to a high (binary logic 1) output signal level.

The change in the output signal from the flash latch circuit 142 operates: to gate the AND gate 148; to select a down count mode of operation from the counter 146; and to enable the AND gate 140 to gate the fast clock pulse train from the clock 134 to the OR gate 138 as previously described. Since the initial reset input to the quench latch circuit 144 operated to reset the quench latch to provide low (binary logic 0) signal levels to the NAND gates 176 and 180 thereby providing high (binary logic 1) signal levels to the AND gate 178, the AND gate 148 was thereby enabled to switch upon receipt of the high (binary logic 1) output signal level from the flash latch 142. As previously discussed, the leading edge of the flash fire control signal operates to fire the flash 150; and in this manner the flash is fired when the shutter blade elements 34 and 36 are in the maximum aperture defining position as shown in FIG. 2 and at the instant that the solenoid 62 is energized to drive the shutter blade elements back to their scene light blocking position as shown in FIG. 1.

Simultaneous to the flash 152 firing, the counter 146 commences counting down the preset minimum count at the fast clock pulse rate from the clock 134. Upon reaching a zero count, the output from the counter 146 switches to actuate the quench latch 144 so as to switch the output therefrom to a high (binary logic 1) output signal level which is directed to respective terminals of the NAND gates 180 and 176. Since the NAND gate 180 was previously disabled by the low (binary logic 0) camera-to-subject logic signal from the line 143 of latch 159, the NAND gate 180 is unaffected by the switching of the quench latch 144. The high (binary logic 1) output signal level from the quench latch 144 operates in conjunction with a high (binary logic 1) output signal level from line 145 of latch 159 to switch the NAND gate 176 upon receipt of a high (binary logic 1) output signal level from the quench latch 186.

As is now readily apparent, firing the flash 150 under conditions of low ambient scene light intensity operates to provide sufficient artificial illumination to be detected and integrated by the light integrating circuit 50 which, in turn, operates to trigger the quench level detector 184. The output signal level at line 122 from the light integrating circuit 50 increases until reaching the trigger level for the level detector 184 which trigger level, as previously discussed, is slightly less than the level representative of an optimum film exposure in order to anticipate for the time delay between the flash quench signal and the flash quench actually occurring as is well known in the art. Triggering the quench level detector 184 to provide a high (binary logic 1) output signal level operates to switch the quench latch 186 to provide a high (binary logic 1) input signal level to the NAND gate 176. Thus, when the counter 146 counts down, the aforementioned preset minimum count and quench level detector 184 is triggered, the NAND gate 176 switches to a low (binary logic 0) output signal level, in turn, switching the AND gate 178 to provide a low (binary logic 0) output signal level so as to, in turn, switch the AND gate 148 to a low (binary logic 0) output signal level and thereby provide the trailing edge of the flash fire control signal. Thus, the quench level detector 184 operates to quench the flash 150 in a well-known manner with the present minimum count in the counter 145 insuring at least a minimum flash output level. The flash quench provided by the quench level detector 184 may exceed the time $T_2$ as shown in FIG. 8 thereby providing a longer flash duration and a higher flash output than was previously possible when the camera was focused for a subject distance less than the select camera-to-subject distance.

Under conditions of high ambient scene light intensity and far subject range greater than the select camera-to-subject distance, the level detector 152 will be triggered prior to the expiration of the aforementioned 35 millisecond time delay and, thus, operates by way of the enabled AND gate 182 to switch the flash latch 142 to a high (binary logic 1) output signal thereby providing the leading edge of the flash fire signal in the aforementioned manner. Since the level detector 152 triggers at a level representative of an optimum exposure value which is slightly higher than the level which the quench level detector 184 triggers, there will be provided a high (binary logic 1) output signal from the quench latch 186 to one input terminal of the NAND gate 176 prior to the flash firing. Firing the flash will initiate the down count mode for the counter 146 so as to count down the minimum preset count to switch the quench latch 144 and thereby switch the NAND gate 176 to provide the flash quench signal in the aforementioned manner. As is readily apparent, under conditions of high ambient scene light intensity and far subject range greater than the select camera-to-subject distance, the flash duration is determined by the minimum preset count inputted to the counter 146 and thus provides a minimal amount of artificial illumination having little or no effect on the exposure. For the aforementioned situation, the exposure is controlled primarily by the level detector 152 which triggers at a level generally corresponding to an optimum film exposure value since the artificial illumination provides a minimal effect on exposure for such far camera-to-subject distances.

Although the aforementioned exposure and flash fire control system has been described in the context of a single lens reflex camera, as previously discussed, it is readily apparent that such a system could also be utilized in cameras of the non-reflex type. Also, it should be readily appreciated that those components of the control circuit 78 associated with controlling the duration of the flash fire signal including: level detectors 124 and 184; time delay circuits 130, 132; clock 134; divide by x circuit 136; gates 128, 140, 148, 176, 178, 180; latches 126, 186, 144; and counter 146 may be contained within the flash housing so that the flash can be detached from the camera housing. As is readily apparent, the flash would then also include its own scene light detector and integrator circuit identical to that shown at 50 to provide the input signals to the level detectors 124 and 184. The flash latch 142 could remain within the camera and still provide the leading edge of the flash fire control signal to the flash in the aforementioned manner. The scene light detection and integration circuit 50 and solenoid control circuit 154 in the camera would be controlled in the same manner by way of an interconnecting line from the time delay circuit 132 in the flash housing. Assuming that the camera and flash were powered from the same battery 164, interconnecting lines between the camera and flash could synchronize the initial energization and reset of the camera and flash circuits upon actuation of the button 170. In addition, it should also be appreciated that although the flash fire control ambient scene light measurement is described as occurring prior to the exposure interval, it could also occur simultaneous to the exposure interval so long as it occurs before the initiation of the firing of the flash.

Other embodiments of the invention, including additions, subtractions, deletions and other modifications of the preferred disclosed embodiments of the invention will be obvious to those skilled in the art and are within the scope of the following claims.

What is claimed is:

1. A photographic camera for use with a variable output source of artificial illumination and including means for defining a film plane and means for transmitting light from a scene along an optical path to expose photosensitive film located in the film plane, said camera comprising:

a ranging mechanism comprising at least one member disposed for movement in general correspondence with the camera-to-subject distance;

a blade mechanism;

means for mounting said blade mechanism for displacement from an initial closed arrangement wherein said blade mechanism precludes scene light from being transmitted along the optical path to the film plane to an open arrangement wherein said blade mechanism defines a maximum size aperture so as to allow the passage of scene light along the optical path to the film plane and then to a final closed arrangement wherein said blade mechanism again precludes scene light from being transmitted along the optical path to the film plane;

drive means responsive to the actuation thereof for effecting the displacement of said blade mechanism from its said initial closed arrangement to its said open arrangement and then into its said final closed arrangement to define an exposure interval during which scene light is incident upon the film plane; and control means responsive to the movement of said ranging mechanism member by a distance corresponding to a camera-to-subject distance less than a selected camera-to-subject distance for providing a flash fire signal during the exposure interval to ignite the source of artificial illumination to provide a determinate amount of artificial illumination, wherein the exposure is controlled primarily by varying the aperture size at which the flash fire signal is provided, said control means being further responsive to the movement of said ranging mechanism member by a distance corresponding to a camera-to-subject distance greater than said selected camera-to-subject distance for providing a flash fire signal during the exposure interval wherein the exposure is controlled primarily by varying the amount of artificial illumination.

2. A photographic camera for use with a variable output source of artificial illumination and including means for defining a film plane and means for transmitting light from a scene along an optical path to expose photosensitive film located in the film plane, said apparatus comprising:

a ranging mechanism comprising at least one member disposed for movement in general correspondence with the camera-to-subject distance;

a blade mechanism;

means for mounting said blade mechanism for displacement from an initial closed arrangement wherein said blade mechanism precludes scene light from being transmitted along the optical path to the film plane to an open arrangement wherein said blade mechanism defines a maximum size aperture so as to allow the passage of scene light along the optical path to the film plane and then to a final closed arrangement wherein said blade mechanism again precludes scene light from being transmitted along the optical path to the film plane;

drive means responsive to the actuation thereof for effecting the displacement of said blade mechanism from its said initial closed arrangement to its said open arrangement and then into its said final closed arrangement to define an exposure interval during which scene light is incident upon the film plane; and control means responsive under conditions of generally low ambient scene light intensity to the movement of said ranging mechanism member by a distance corresponding to a camera-to-subject distance less than a selected camera-to-subject distance for providing a flash fire signal during the exposure interval at the instant when the blade mechanism defines an aperture size generally corresponding to the camera-to-subject distance thereby igniting the source of artificial illumination to provide a determinate amount of artificial illumination, said control means being further responsive to the movement of said ranging mechanism member by a distance corresponding to a camera-to-subject distance greater than said selected camera-to-subject distance for providing a flash fire signal during the exposure interval subsequent to the blade mechanism reaching said second arrangement and for thereafter controlling the source of artificial illumination to provide an increasing amount of artificial illumination in general corresponding relation with respect to increasing camera-to-subject distances beyond said selected camera-to-subject distance.

3. The photographic camera of claim 1 wherein under conditions of high ambient scene light intensity, said control means may respond to the movement of said ranging mechanism member by a distance corresponding to a camera-to-subject distance less than said selected camera-to-subject distance to provide a flash fire signal during the exposure interval at an instant when the blade mechanism defines an aperture size less than the aperture size corresponding to the actual camera-to-subject distance, and wherein said control means may further respond to the movement of said ranging mechanism member by a distance corresponding to a camera-to-subject distance greater than said selected camera-to-subject distance to provide a flash fire signal during the exposure interval at an instant when said blade mechanism defines an aperture size less than the maximum aperture size defined by said blade mechanism in said second arrangement.

4. The photographic camera of claim 3 wherein said control means includes means for detecting ambient scene light prior to the exposure interval and for responding: to the detection of ambient scene light below a first select level to provide an amount of artificial illumination during the exposure interval corresponding to said determinate amount of artificial illumination when the movement of said ranging member corresponds to a camera-to-subject distance less than said selected camera-to-subject distance, to the detection of ambient scene light above a second select level greater than said first select level to provide another amount of artificial illumination during the exposure interval less than said determinate amount of artificial illumination when the movement of said ranging member corresponds to a camera-to-subject distance less than said selected camera-to-subject distance, and to the detection of ambient scene light between said first and second levels to provide an amount of artificial illumination during the exposure interval between said other and said determinate amounts of illumination wherein the amount of artificial illumination progressively varies between said other and said determinate amounts in inverse corresponding relation with respect to the progressive variation in the detected scene light between said first and second select levels.

5. The photographic camera of claims 2 or 3 wherein said control means includes means for detecting and integrating scene light in correspondence with the scene light admitted by said blade mechanism to the film plane during said exposure interval and for providing an output signal in correspondence to the amount of scene light so detected, and the source of artificial illumination comprises an electronic flash of the quench type wherein the amount of artificial illumination provided by the electronic flash is controlled by varying the duration of the flash of artificial illumination through the quench, said output signal from said scene light detecting and integrating means operating to control the quenching of the electronic flash to provide the appropriate amount of artificial illumination when said ranging member is moved to correspond to a camera-to-subject distance greater than said selected camera-to-subject distance.

6. The photographic camera of claim 5 wherein said control means comprises sensing means positioned in response to the movement of said ranging member in accordance with the camera-to-subject range along a locus of travel adjacent said blade mechanism and mounting means locus of travel such that said sensing means provides one select output signal responsive to said blade mechanism being in its said initial closed arrangement and said ranging member being moved to correspond to a camera-to-subject distance less than said select camera-to-subject distance and another select output signal responsive to said blade mechanism being in its said initial closed arrangement and said ranging member being moved to correspond to a camera-to-subject distance greater than said select camera-to-subject distance.

7. The photographic camera of claim 6 comprising an adjustable focus objective lens wherein said ranging member comprises a focusing wheel for adjusting the focus condition of said objective lens.

8. The photographic camera of claim 6 wherein subsequent to said ranging member being moved to correspond to a camera-to-subject distance less than said select camera-to-subject distance, said sensing means further responds during said exposure interval to said blade mechanism and mounting means reaching a position in which said blade mechanism defines an effective aperture value corresponding to the camera-to-subject distance to provide a flash fire signal.

9. The photographic camera of claim 6 wherein: said sensing means comprises a source of artificial illumination and a photoresponsive element and said blade mechanism and mounting means locus of travel extends between said sensing means source of artificial illumination and said photoresponsive element so as to unblock the light path between said sensing means source of artificial illumination and said photoresponsive element when said blade mechanism is in its said initial closed arrangement and said ranging member is moved to correspond to a camera-to-subject distance greater than said select camera-to-subject distance and to block the light path between said sensing means source of artifical illumination and said photoresponsive element when said blade mechanism is in its said initial closed arrangement and said ranging member element is moved to correspond to a camera-to-subject distance less than said select camera-to-subject distance.

10. The photographic camera of claim 9 comprising an adjustable focus objective lens wherein said ranging member comprises a focusing wheel for adjusting the focusing condition of said objective lens.

11. The photographic camera of claim 9 wherein subsequent to said ranging member being moved to correspond to a camera-to-subject distance less than said select camera-to-subject distance, said blade mechanism and mounting means locus of travel extends between said sensing means source of artificial illumination and said photoresponsive element so as to unblock the light path between said sensing means source of artifical illumination and said photoresponsive element during said exposure interval when said blade mechanism reaches the aperture defining position corresponding to the camera-to-subject distance to provide a flash fire signal.

12. The camera of claim 5 wherein said blade mechanism comprises a pair of shutter blade elements each having a primary scene light admitting aperture therethrough for admitting scene light along the optical path and a scene light detecting secondary aperture therethrough for admitting scene light to said scene light detecting and integrating means and wherein said blade mounting means mounts said shutter blade elements for general counter-reciprocating movement with respect to each other and comprises a walking beam pivotally connected at opposite ends thereof to respective ones of said shutter blade elements and pivotally connected for rotation about an axis between said opposite ends so as to impart generally counter-reciprocating movement to said shutter blade elements upon rotation thereof about said center axis and said control means comprises sensing means positioned in response to the movement of said ranging member in accordance with the camera-to-subject distance along a locus of travel adjacent the locus of rotation of said walking beam such that said sensing means provides one select output signal responsive to said walking beam being in said initial closed arrangement and said ranging member being moved to correspond to a camera-to-subject distance less than said select camera-to-subject distance and another select output signal responsive to said blade mechanism being in its said initial closed arrangement and said ranging member being moved to correspond to a camera-to-subject distance greater than said select camera-to-subject distance.

13. The photographic camera of claim 12 comprising an adjustable focus objective lens wherein said ranging member comprises a focusing wheel for adjusting the focus condition of said objective lens.

14. The photographic camera of claim 12 wherein subsequent to said ranging member being moved to correspond to a camera-to-subject distance less than said select camera-to-subject distance, said sensing means further responds during said exposure interval to said walking beam reaching a position in which said shutter blade elements define an effective aperture value corresponding to the camera-to-subject distance to provide a flash fire signal.

15. The photographic camera of claim 12 wherein: said sensing means comprises a source of artificial illumination and a photoresponsive element and said walking beam locus of travel extends between said sensing means source of artificial illumination and said photoresponsive element so as to unblock the light path between said sensing means source of artificial illumination and said photoresponsive element when said walking beam is in the initial closed arrangement and said ranging member is moved to correspond to a camera-to-subject distance greater than said select camera-to-subject distance and to unblock the light path between said sensing means source of artifical illumination and said photoresponsive element when said walking beam is in the initial closed arrangement and said ranging member is moved for a camera-to-subject distance less than said select camera-to-subject distance.

16. The photographic camera of claim 15 comprising an adjustable focus objective lens wherein said ranging member comprises a focusing wheel for adjusting the focus condition of said objective lens.

17. The photographic camera of claim 15 wherein subsequent to said ranging mechanism element being moved to correspond to a camera-to-subject distance less than said select camera-to-subject distance, said walking beam locus of travel extends between sensing means source of artificial illumination and said photoresponsive element so as to unblock the light path between said sensing means source of artificial illumination and said photoresponsive element during said exposure interval when said shutter blade elements reach the aperture defining position corresponding to the camera-to-subject distance to provide a flash fire signal.

* * * * *